United States Patent
Kattsyn et al.

(10) Patent No.: US 6,702,022 B2
(45) Date of Patent: **\*Mar. 9, 2004**

(54) METHOD AND DEVICE TO REDUCE ASPHALTENE AND PARAFFIN ACCUMULATIONS IN WELLS

(76) Inventors: Gennady V. Kattsyn, Respubliki Str. 43, #159, Krasnoyarsk (RU), 660009; Boris E. Kogai, Vesny Str. 2, #52, Krasnoyarsk (RU), 660077

( * ) Notice: Subject to any disclaimer, the term of this patent is extended or adjusted under 35 U.S.C. 154(b) by 0 days.

This patent is subject to a terminal disclaimer.

(21) Appl. No.: 09/886,077

(22) Filed: Jun. 20, 2001

(65) Prior Publication Data

US 2003/0062165 A1 Apr. 3, 2003

(51) Int. Cl.[7] .................................... E21B 37/06
(52) U.S. Cl. .................. 166/304; 166/311; 166/371; 507/90; 507/270; 507/902; 507/930; 507/931
(58) Field of Search ................. 166/304, 311, 166/300, 279, 310, 371; 507/90, 270, 902, 930, 931

(56) References Cited

U.S. PATENT DOCUMENTS

| | | |
|---|---|---|
| 3,402,770 A | 9/1968 | Messenger |
| 3,531,409 A | 9/1970 | Seffens et al. |
| 3,914,132 A | 10/1975 | Sutton |
| 4,125,458 A | 11/1978 | Bushnell et al. |
| 4,207,193 A | 6/1980 | Ford et al. |
| 4,393,938 A * | 7/1983 | Lawson et al. ............. 166/279 |
| 4,614,236 A | 9/1986 | Watkins et al. |
| 4,775,489 A | 10/1988 | Watkins et al. |
| 4,846,278 A * | 7/1989 | Robbins ..................... 166/286 |
| 4,846,279 A * | 7/1989 | Bruce ........................ 166/310 |
| 5,922,652 A * | 7/1999 | Kowalski et al. ........... 507/129 |
| 6,279,656 B1 * | 8/2001 | Sinclair et al. ............. 166/310 |

OTHER PUBLICATIONS

Russian Federation Patent 2122628 to Belyaev, The device for removing of asphalteno–resinous and/or paraffino–hydrate accumulations, Jun. 20, 1997.
Russian Federation Patent 2105867 to Katsyn, Apparatus for detstroying of asphaltene–resinous and paraffino–hydrate accumulations in well, Jul. 11, 1997.
Russian Federation Patent 2028447 to Belyaev, Method of asphaltene–resinous and paraffino–hydrate accumulations (ARPHA) removal, Oct. 15, 19915.

* cited by examiner

*Primary Examiner*—Zakiya Walker

(57) ABSTRACT

An oil well capsule to reduce the paraffin and asphaltene which accumulate on the walls of the pipes which are used to bring the oil up from underground deposits, and a method of using the oil well capsule. An oil well capsule having a shell encapsulating a chemically active mass wherein the chemically active mass consists essentially of alkaline or alkaline earth metal.

2 Claims, 2 Drawing Sheets

METHOD AND DEVICE TO REDUCE ASPHALTENE AND PARAFFIN ACCUMULATIONS IN WELLS

FIELD OF THE INVENTION

The instant invention relates to methods and articles for cleaning oil wells and more particularly to articles and methods for cleaning pressure differential oil wells.

BACKGROUND

The buildup of paraffin and asphaltene in oil wells is a problem in the oil industry. Paraffin and asphaltene as well as other impurities accumulate on the walls of the pipes which are used to bring the oil up from underground deposits. If not removed, these accumulations will eventually build up to the point that the flow of oil is significantly reduced and the well may become inoperable. Currently, paraffin and asphaltene buildup is handled by periodically pumping very hot oil, augmented by cleansing additives, down the pipe in order to melt the accumulations. The melted paraffin and asphaltene are then forced out of the well by the continuing upward flow of oil. Moreover, the hot oil method must be repeated quite often. Paraffin and asphaltene buildup is also handled by use of a device which "reams out" the paraffin and asphaltene. The reaming method is time consuming and does not remove all the deposits. Further, existing methods cannot be used to restore old pipes which have been shut down because of excessive paraffin and asphaltene accumulations. Further, existing methods of accumulation removal require a crew of several workers to operate. Moreover, existing methods do not work efficiently with under sea oil wells. Moreover, existing methods require the flow of oil to be interrupted during the period of the cleaning process.

The differing kinds of oil wells include the gas-lift well, which brings oil to the surface largely through naturally occurring pressure differentials, the rod and pump well, which uses a rod to act as a pump to bring the oil to the surface, and the centrifugal pump well, where a pump is placed in the depths of the well to create a pressure differential to bring oil to the surface.

The following represents a list of known related non domestic art:

Russian Fed. Patent 2028447, to Belyaev on Oct. 15, 1991;

Russian Fed. Patent 2105867, to Katzyn et al, on Jul. 11, 1997; and

Russian Fed. Patent 2122628, to Belyaev, on Jun. 20, 1997.

None of the above inventions and patents, taken either singularly or in combination, is seen to describe the instant invention as claimed. Thus solving the aforementioned problems is desired.

The following represents a list of known related domestic art:

U.S. Pat. No. 3,402,770, to Messenger, on Sep. 24, 1968

U.S. Pat. No. 3,531,409, to Seffens et al, on Sep. 29, 1970

U.S. Pat. No. 3,914,132, to Sutton, on Oct. 21, 1975

U.S. Pat. No. 4,125,458, to Bushnell, et al., on Nov. 14, 1978

U.S. Pat. No. 4,207,193, to Ford, et al, on Jun. 10, 1980;

U.S. Pat. No. 4,614,236, to Watkins et al, on Sep. 30, 1986; and

U.S. Pat. No. 4,775,489, to Watkins et al., on Oct. 4, 1988.

The teachings of each of the above-listed domestic citations (which does not itself incorporate essential material by reference) are herein incorporated by reference. None of the above inventions and patents, taken either singularly or in combination, is seen to describe the instant invention as claimed. Thus solving the aforementioned problems is desired.

Heretofore, an article and method for reducing asphaltene and paraffin accumulations in oil wells through use of a capsule enclosing a chemically active mass which is inserted into an oil well and which slides down the solid well, reacting with and reducing asphaltene and paraffin accumulations as it travels down the well, has not previously been provided. An article and method for reducing asphaltene and paraffin accumulations in oil wells through use of a capsule enclosing a chemically active mass with a gel precursor core which is inserted into an oil well and which slides down the solid well, reacting with and reducing asphaltene and paraffin accumulations as it travels down the well, has not previously been provided. An article and method for coating the inside of oil wells with a gel to impede the startup and growth of paraffin and asphaltene has not previously been provided. An article and method for reducing asphaltene and paraffin accumulations in oil wells, and providing a protective layer to impede the growth of asphaltene and paraffin, which requires three or fewer individuals to operate has not previously been provided. An article and method for reducing asphaltene and paraffin accumulations in oil wells, and providing a protective layer to impede the growth of asphaltene and paraffin, which can be used to open up for use oil wells that have been abandoned due to excessive accumulation of paraffin and asphaltene has not previously been provided. An article and method for reducing asphaltene and paraffin accumulations in oil wells, and providing a protective layer to impede the growth of asphaltene and paraffin, which can be used for under sea wells, has not previously been provided.

OBJECTS AND ADVANTAGES

Accordingly, it is an object to provide novel articles and methods for solving the above-mentioned problems. In particular, it is an object to provide an article and method for reducing asphaltene and paraffin accumulations in oil wells through use of a capsule enclosing a chemically active mass with a gel precursor core which is inserted into an oil well and which slides down the solid well, reacting with and reducing asphaltene and paraffin accumulations as it travels down the well. It is an object to provide an article and method for coating the inside of oil pipes with a gel to impede the startup and growth of paraffin and asphaltene. It is an object to provide an article and method for reducing asphaltene and paraffin accumulations in oil wells, and providing a protective layer to impede the growth of asphaltene and paraffin, which requires three or fewer individuals to operate. It is an object to provide an article and method for reducing asphaltene and paraffin accumulations in oil wells, and providing a protective layer to impede the growth of asphaltene and paraffin, which can be used to open up for use oil wells that have been abandoned due to excessive accumulation of paraffin and asphaltene. It is an object to provide an article and method for reducing asphaltene and paraffin accumulations in oil wells, and providing a protective layer to impede the growth of asphaltene and paraffin, which can be used for under sea wells. It is an object to provide an article and method for reducing asphaltene and paraffin accumulations in oil wells during the cleaning period without significantly interrupting the flow of oil in the well. It is a further object of the invention to provide improved elements and arrangements thereof for the purposes described which is inexpensive, dependable and fully effective in accomplishing its intended purposes. These and other objects of the present invention will become readily apparent upon further review of the following specification and drawings.

The novel articles and methods provide a number of advantages. Advantage arises from the reduction of asphaltene accumulations in an oil well treated with the disclosed invention. Advantage arises from the reduction of paraffin accumulations in an oil well treated with the disclosed invention. Advantage arises from the adaptability of the present invention to use with under sea wells. Advantage arises from the ability of the present invention to reopen closed oil wells through treatment by the present invention. Advantage arises from the small work crew that is needed or use of the present invention. Advantage arises from the ability to clean the well with the presently described invention without significantly interrupting the flow of oil during the cleaning period.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

Potential customers for articles and methods that meet these objects include oil companies, oil well operators and suppliers, engineers, scientists, among others.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy. An attempt has been made specifically to point out any dimensions, tolerances, etc., which are important.

Figure 1:
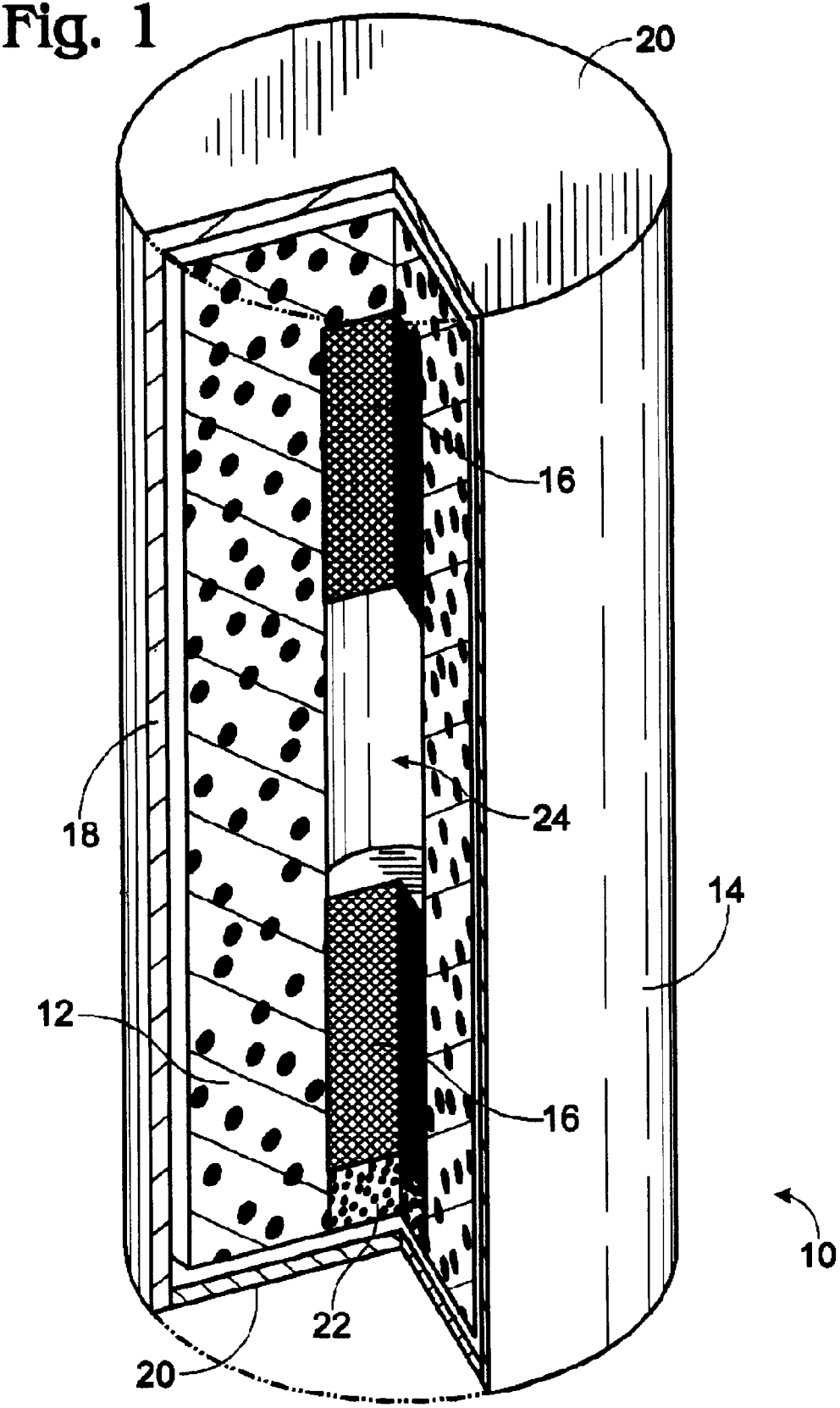
FIG. 1 shows an embodiment of the present invention with the gel precursor option.

An oil well capsule is provided for use on pressure differential wells. With reference to FIG. 1, an oil well capsule 10 comprises a chemically active mass 12 wrapped in a shell 14. A gel precursor 16 within a hollowed core 24 of said chemically active mass may optionally be provided. The capsule preferably has the shape of a cylindrical tube. Capsule diameter and length can be sized to accommodate differing oil wells In the preferred embodiment, length is 500 millimeters (mm) and diameter is 36 mm.

The shell 14 wraps the chemically active mass. In the preferred embodiment, the shell is made of ordinary aluminum foil. The shell has three components: a rectangular body 18 with length and height, and two end pieces 20. The foil has a thickness in the range 0.01 to 0.4 mm. The diameter of the end pieces is preferably 36 mm. The two end pieces 20 are circular in shape and form the terminals of the capsule. The length of the body is preferably 500 mm. The height of the body corresponds to the diameter of the capsule such that the height equals 10 mm plus the product of Pi, estimated as 3.14, multiplied by the diameter. The 10 mm in the height calculation represents the excess over-cover of the capsule when the body is wrapped around the chemically active mass to make the capsule. The height of the body is 123 mm. The shell can have differing dimension to adapt to different sizes of the capsule.

The chemically active mass consists essentially of alkaline or alkaline earth metal, and can be sodium, lithium, potassium, calcium, strontium, barium or combinations of them. In the preferred embodiment, the chemically active mass consists essentially of sodium.

To form the chemically active mass into a cylindrical form to be wrapped by the shell, alkaline or alkaline earth metal in powdered form is heated to the melting point temperature of the metal, under a small layer of paraffin to prevent metal interaction with oxygen. The chemically active mass is then cast in a cylinder mold. Alternatively, the metal is pressed in the cylinder form without melting due to plasticity of the metal at room temperature.

A weight increaser can be added to the chemically active mass. The weight increaser consists essentially of inert powder with density not less than 2 grams per centimeter cubed ($g/cm^3$). Inert powder is chosen from the selection consisting of barite powder, sand, and iron powder. The weight increaser can be added by pressing the weight increaser into the heated chemically active mass. This can be accomplished by distributing the weight increaser generally uniformly on the surface of the chemically active mass and then pressing the distributed weight increaser into the mass with a plan press before the resulting mass is formed into a cylindrical form. Alternatively, the chemically active mass can be put into a cylindrical press form and the weight increaser distributed along the axis when heated, and then pressing the press form halves together. Yet another equivalent manner in which to add weight increaser includes melting the chemically active mass under a small layer of paraffin, or under the inert gas atmosphere, e.g. argon or nitrogen, mixed with weight increaser in a 10 to 1 ratio, and stirring, cooling, and forming.

A gel precursor within a core of said chemically active mass can be provided. A gel precursor consists essentially of aluminum or scandium. A core in the chemically active mass is prepared for receiving the gel precursor by mechanically pressing out a cylindrical cavity in the chemically active mass. Preferably, the pressing out occurs before the shell is put on the chemically active mass. In the preferred embodiment a hard rod of diameter 8 to 10 mm and height 500 mm is pushed into the chemically active mass, roughly in the center of said mass, and downward to within 10 to 15 mm of the opposite end of the device. The rod is then removed. The resulting hollowed core 24 is filled with pressed aluminum or scandium tablets (diameter 8–10 mm) or aluminum or scandium powder, to within 10–15 mm of the top of the cavity. The core is then plugged with a cork 22 fashioned from the chemically active mass material. The height of the cork is 10–15 mm and diameter is 8–10 mm.

The shell body and end pieces are placed on a heat source. Preferably, the heat source is a steel slab, preferably having a thickness approximately 10 mm and with length and width a little more than the length and width of the shell body and end pieces, which is placed on a heated electric stove. Heat source can be copper, or any other metal which can be heated. Can be on a basic kitchen stove, with proper dimensions. Heated metal to be generally uniform temperature when heated.

Shell can be treated with melted bitumen. The shell is heated to the temperature at which bitumen melts, preferably 70 to 90 degrees Celsius. Bitumen is spread on the internal surfaces of the body and end pieces, by putting a piece of bitumen on the surfaces, and spreading the piece as the bitumen melts. In the preferred mode, the bitumen is spread by use of a brush. Preferably, the thickness of the bitumen spread should be in the range of 0.1 mm to 0.5 mm. Alternatively, instead of bitumen, another hydrocarbon composition can be used, such as a composition consisting essentially eighty percent mineral oil and twenty percent paraffin or polypropylene, or combinations of them.

After the shell components have been heated and treated, the chemically active mass is placed on the shell body and rolled up leaving an open ended capsule, cylindrical in shape. The shell end pieces are then placed on each end and the overlap from the shell body is formed around the ends of the cylinder.

To get additional insulation to the oil well capsule to protect it from interaction with oxygen, melted paraffin can be spread with a brush on the outer surface of the oil well capsule as assembled.

Figure 2:
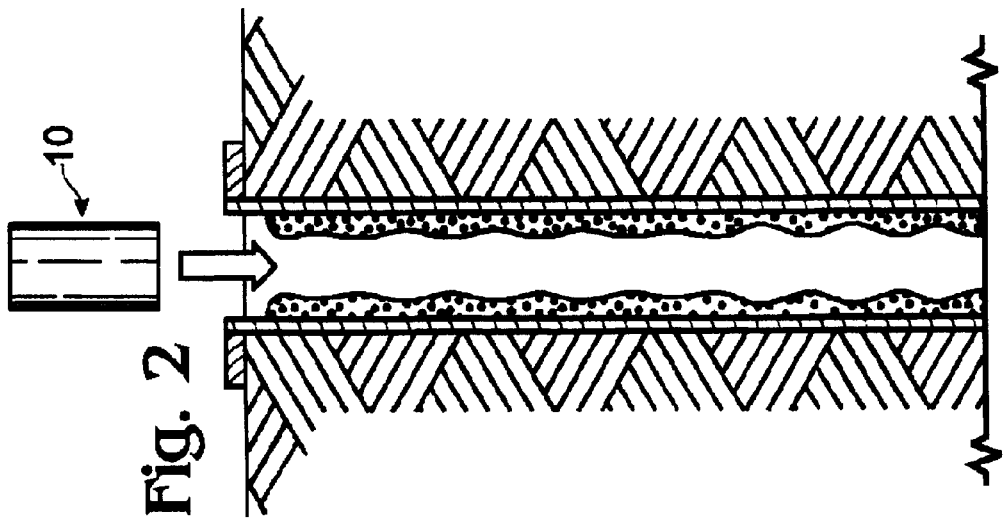
FIGS. 2 through 4 show an embodiment of the present invention in operation.
Figure 3:
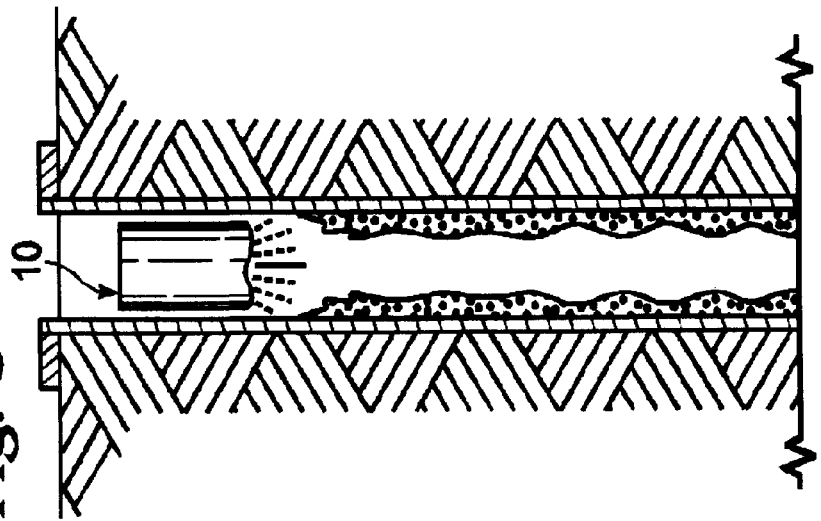
Figure 4:
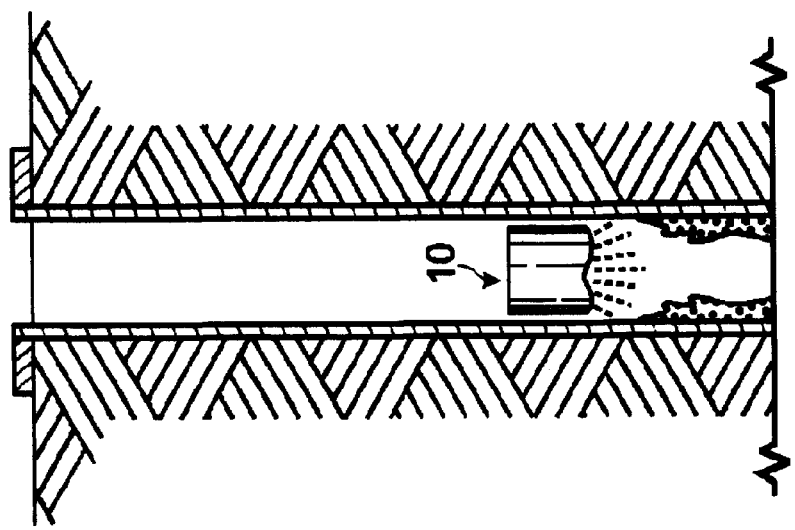

Referring to FIGS. 2 through 4, in operation, the oil well capsule is prepared for insertion in an oil well by cutting a terminal in the end of the capsule, and then the capsule is inserted into the head of a pressure differential oil well. The reaction starts when the metal contacts the water in the well. The capsule is heavy enough that it will slowly slide down the pipe. It generates a temperature high enough to melt the paraffin and asphaltene accumulated on the inside of the oil pipes. The general reaction formula is as follows:

$$2M+2H_2O=2MOH+H_2+heat$$

$$6MOH+2R=2(MO)3R(gel)+3H_2+heat$$

Where M is an alkaline or alkaline earth metal and R is aluminum powder or scandium powder. The $H_2O$ can come from any type of water, including salt water.

As shown in FIGS. 2 through 4, as the capsule slides down the well, it consumes itself in the process of generating enough heat to melt the paraffin and asphaltene. Eventually it is consumed with no residue remaining in the pipe.

This method significantly increases the time between oil well cleanings. With traditional cleaning methods, the crystallization centers of the paraffin and aslphaltene accumulations remain on the oil well pipe walls, with the result that the build up of the accumulations resumes as soon as the wells have been cleaned. Conversely, the oil well capsule of the present invention increases the temperature in the area where it is applied to a level higher than the congealing point of paraffin hydrocarbon. This makes it possible to remove completely the paraffin crystallization centers from the oil well walls and prevent solid deposits on them.

When the oil well capsule is provided with a gel precursor, as the capsule descends, the gel precursor in the middle of the capsule is transformed to gel by the chemical reaction and is deposited on the inside of the oil wells. This gel acts like a grease and prevents paraffin accumulations. The gel sticks to the oil well walls and remains on the walls for a long time which then makes it difficult for new accumulations of paraffin and asphaltene to begin.

With the present invention using the gel precursor, the time between oil well cleanings can be increased by anywhere from 3 to 8 times. That is, if the normal cleaning period is month, it can be extended from anywhere from 3 to 8 months, depending upon the chemical composition of the oil being pumped.

It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are also possible, their specific designs depending upon the particular application. As such, the scope of the invention should not be limited by the particular embodiments herein described but should be defined only by the appended claims and equivalents thereof.

We claim:

1. A method of reducing and preventing asphaltene and paraffin accumulations in pressure differential oil wells, comprising the steps of:

enclosing a chemically active mass in a shell wherein said chemically active mass consists essentially of alkaline or alkaline earth metal, and wherein said shell is consumed by the reaction of said chemically active mass with water;

opening one end of said shell to expose the chemically active mass;

placing said shell into a pressure differential well, wherein the chemically active mass exposed by the opening of said shell reacts to the water in said well;

releasing said shell;

consuming paraffin and asphaltene accumulations in said well through the heat generated by the reaction of said chemically active mass with the water in said well;

generating a gel to coat the inside of said well, wherein said gel is formed from the reaction of said chemically active mass with said water in said well, and wherein said chemically active mass encloses a gel precursor chosen from the group of aluminum and scandium disposed within a hollowed core of said chemically active mass; and coating the inside of said well with said gel.

2. The method of claim 1, wherein said reduction and prevention of asphaltene and paraffin accumulations occurs simultaneously with the process of bringing oil to the surface.

* * * * *